US010831512B2

(12) United States Patent
Walker et al.

(10) Patent No.: US 10,831,512 B2
(45) Date of Patent: Nov. 10, 2020

(54) CAPTURING USER INTERACTIONS

(71) Applicant: MICROSOFT TECHNOLOGY LICENSING, LLC, Redmond, WA (US)

(72) Inventors: Toby Walker, Cambridge, MA (US); Sarvesh Nagpal, Redmond, WA (US); Aidan Crook, Bellevue, WA (US)

(*) Notice: Subject to any disclaimer, the term of this patent is extended or adjusted under 35 U.S.C. 154(b) by 52 days.

(21) Appl. No.: 15/639,955

(22) Filed: Jun. 30, 2017

(65) Prior Publication Data

US 2019/0004823 A1 Jan. 3, 2019

(51) Int. Cl.
*G06F 9/451* (2018.01)
*G06F 40/106* (2020.01)
*G06F 16/958* (2019.01)
*G06F 11/34* (2006.01)
*G06F 11/30* (2006.01)
*H04L 29/08* (2006.01)

(52) U.S. Cl.
CPC .......... *G06F 9/451* (2018.02); *G06F 11/302* (2013.01); *G06F 11/3438* (2013.01); *G06F 16/958* (2019.01); *G06F 40/106* (2020.01); *H04L 67/02* (2013.01); *H04L 67/22* (2013.01); *G06F 11/3082* (2013.01)

(58) Field of Classification Search
CPC ..................................................... G06F 17/00
See application file for complete search history.

(56) References Cited

U.S. PATENT DOCUMENTS

| 7,171,648 | B1* | 1/2007 | Finocchio | G06F 9/44 |
| 8,844,032 | B2* | 9/2014 | Saidi et al. | G06F 21/00 |
| 2007/0172063 | A1* | 7/2007 | Biggs et al. | H04K 1/10 |
| 2010/0013777 | A1* | 1/2010 | Baudisch et al. | G06F 3/041 |
| 2010/0287013 | A1 | 11/2010 | Hauser | |
| 2011/0213822 | A1* | 9/2011 | Yavilevich | G06F 15/16 |
| 2012/0159392 | A1* | 6/2012 | Kauerauf | G06F 2/048 |
| 2013/0097539 | A1* | 4/2013 | Mansson et al. | G06F 3/048 |
| 2013/0104024 | A1 | 4/2013 | Rajkumar et al. | |
| 2013/0263280 | A1* | 10/2013 | Cote | G06F 21/62 |
| 2013/0304906 | A1 | 11/2013 | Yavilevich et al. | |

(Continued)

FOREIGN PATENT DOCUMENTS

EP 2141614 A1 1/2010

OTHER PUBLICATIONS

Williams, et al., "Detecting Good Abandonment in Mobile Search", In Proceedings of the 25th International Conference on World Wide Web, Apr. 11, 2016, pp. 495-505.

(Continued)

*Primary Examiner* — James J Debrow

(74) *Attorney, Agent, or Firm* — Shook, Hardy & Bacon, LLP

(57) ABSTRACT

Systems, methods, and computer-readable storage media are provided for capturing a state of a user interface. A state of the user interface presented by an application is identified, the user interface comprising a plurality of user interface elements. An indication of a modification to the user interface or an indication of user activity is received, where the indication of user activity is associated with one of the plurality of user interface elements. The state of the user interface is modified based on at least one of the indication of a modification to the user interface or user activity.

20 Claims, 5 Drawing Sheets

(56) References Cited

U.S. PATENT DOCUMENTS

| | | | |
|---|---|---|---|
| 2014/0013247 A1* | 1/2014 | Beechuk et al. | H04L 65/403 |
| 2014/0089472 A1 | 3/2014 | Tessler | |
| 2015/0082135 A1 | 3/2015 | Schlesinger et al. | |
| 2015/0350338 A1* | 12/2015 | Barnett et al. | H04L 29/08 |
| 2016/0103996 A1* | 4/2016 | Salajegheh et al. | G06F 21/57 |
| 2016/0188188 A1* | 6/2016 | Daemen et al. | G06F 3/0484 |
| 2016/0350083 A1* | 12/2016 | Riebs et al. | G06F 8/34 |
| 2018/0253215 A1* | 9/2018 | Powell | |
| 2018/0332128 A1* | 11/2018 | Gunther et al. | G06F 3/0481 |

OTHER PUBLICATIONS

Huang, et al., "Web User Interaction Mining from Touch-Enabled Mobile Devices", In Proceedings of Sixth International Symposium on Human-Computer Interaction and Information Retrieval, Oct. 4, 2012, 4 pages.

Lagun, et al., "Towards Better Measurement of Attention and Satisfaction in Mobile Search", In Proceedings of the 37th international ACM SIGIR conference on Research & development in information retrieval, Jul. 6, 2014, pp. 113-122.

Martin-Albo, et al., "Strokes of insight: User intent detection and kinematic compression of mouse cursor trails", In International Journal of Information Processing and Management, vol. 52, Issue 6, Nov. 30, 2016, 2 pages.

Walton, Philip, "Autotrack", https://www.npmjs.com/package/autotrack, Retrieved on: Mar. 22, 2017, 11 pages.

Miller, Peter, "Measuring Viewport size with Google Analytics", http://petemill.com/writing/20111102-measuring-viewport-size-with-google-analytics/, Retrieved on: Mar. 22, 2017, 2 pages.

Leiva, et al., "Building a Better Mousetrap: Compressing Mouse Cursor Activity for Web Analytics", In Proceedings of Information Processing & Management, vol. 21, Issue 2, Mar. 2015, pp. 1-23.

"Clicktale", https://www.clicktale.com/, Published on: 2015, 5 pages.

Atterer, et al., "Knowing the User's Every Move- User Activity Tracking for Website Usability Evaluation and Implicit Interaction", In Proceedings of the 15th international conference on World Wide Web, May 23-26, 2006, pp. 203-212.

"International Search Report and Written Opinion Issued in PCT Application No. PCT/US18/034513", dated Aug. 7, 2018, 13 Pages.

* cited by examiner

CAPTURING USER INTERACTIONS

BACKGROUND

Capturing user interactions, such as interactions while users browse a page, can be valuable for client and web application providers. By capturing user interactions, e.g., application providers can modify content of applications and provide services that are of increased valued to users. However, currently available tools do not provide a robust set of data, preventing application providers from using this data and/or requiring application providers to make assumptions about user interactions. Thus, improvements in capturing user interactions are needed.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In various embodiments, systems, methods, and computer-readable storage media are provided for capturing user interactions. For example, a state of a user interface of an application is captured, where items of content on the application presentation are identified by type and location. For example, on a web page rendered in HTML, the elements of HTML are captured. In a native client application, the widgets (text, buttons, etc.) rendered by the device are captured using means such as an accessibility interface provided by the device. User activities and modifications to the user interface are captured and may be associated with the identified items of content. An action is performed based on the user activities and modifications. For example, if a change to the application is detected, an application provider can block the page or otherwise flag the page as being modified.

BRIEF DESCRIPTION OF THE DRAWINGS

Aspects of the disclosure are described in detail below with reference to the attached drawing figures, wherein.

DETAILED DESCRIPTION

Figure 1:
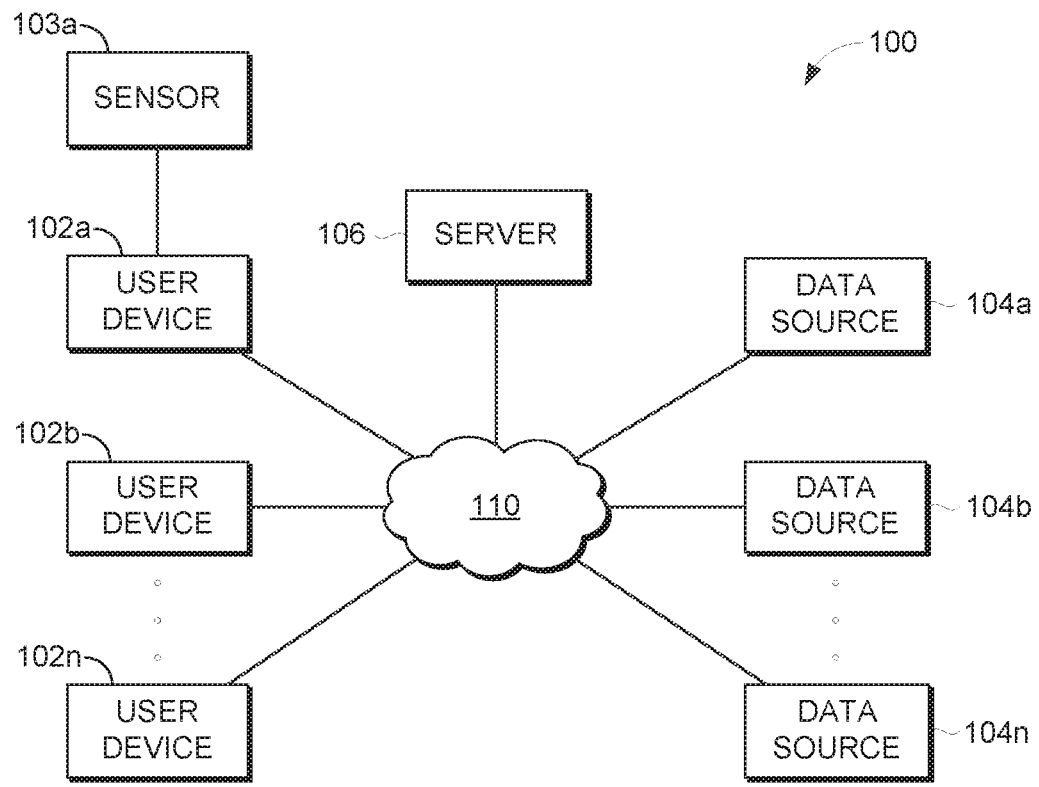
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for capturing user interactions. By way of example and not limitation, a state of a user interface presented by an application is identified, the user interface comprising a plurality of user interface elements. User application and system activities are identified and associated with at least one of the identified content items. An action is performed based on the user activities and modifications. Each activity or modification, if appropriate, can be associated with at least one of the identified content items. The application provider can take specific actions based on the tracked activities or information inferred from those activities.

Generally, an application provider may wish to capture information about user interactions and the content displayed to a user. Such information can include user, application, and system actions and must be tracked in real-time as a user interacts with an application. For example, an application provider may wish to know if a third party, such as a browser plug-in or network device, is modifying the application. As another example, an application provider may be interested in knowing how a user is interacting with an application in order to make changes or updates to the application. It should be understood that the term application includes client applications (i.e., applications running on a client device) as well as online applications, where part of the application runs on a client (e.g., a browser) and other part run in a distributed cloud.

There currently exist conventional solutions for capturing user interactions. For example, data on a user inputting values in fields and navigating an application, e.g., clicking a link or a back button, can be collected. However, the type of data collected may be fairly limited. For example, if a user spends a certain amount of time with an image centered in the display area, this information may not be captured until the user directly interacts with the image. Thus, additional information on the user interaction with the image is not collected. In addition, instructions to capture the user interactions need to be provided upon creation of the application, e.g., coded in JavaScript, and thus, the interactions are limited to those designed into the application.

Accordingly, systems, methods, and computer-readable storage media are provided for efficiently and accurately capturing user interactions at scale using identified elements of an application.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; server 105; and network 110. It should be understood that environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 105 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 105 can be on the server-side of operating environment 100. Server 105 can comprise server-side software designed to work in conjunction with client-side software on user devices 102a and 102b through 102n, so as to implement any combination of the features and functionalities discussed in the present disclosure. This division of operating environment 100 is provided to illustrate one example of a suitable environment, and there is no requirement for each implementation that any combination of server 105 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 5 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized meter or measuring device, an appliance, a consumer electronic device, a workstation, or any combination of these delineated devices, a combination of these devices, or any other suitable computer device.

Server 105 can be a web server configured to provide applications to user devices 102a and 102b through 102n. The applications can contain static content (e.g., previously configured and stored on the web server), dynamic content (e.g., created in response to a user input or other event), or both static and dynamic content. Furthermore, server 105 can retrieve content from one or more content servers (not illustrated) and providing the content as an application to user devices 102a and 102b through 102n.

Sensor 103a may comprise any type of sensor configured to capture a user's interaction with any one of user devices 102b through 102n. For example, sensor 103a can capture the stream of pointer activity associated with a pointing mechanism such as mouse, a pen, a touch point, or other pointing instrument. As another example, sensor 103a can track the eye movement of a user so that a user's focus on a display area of the user device can be identified. It should be understood that sensor 103a can capture many other types of interactions, such as accelerometer data, location data of the user and user device, keyboard presses, the display location and size, movement of the viewing area, e.g., scrolling, among others. It should be understood that although FIG. 1 shows only user device 102a comprising sensor 103a, this is shown for illustrative purposes only, and any of user devices 102b through 102n can also comprise a sensor.

Data sources 104a and 104b through 104n may comprise data sources and/or data systems, which are configured to make data available to any of the various constituents of operating environment 100, or system 200 described in connection to FIG. 2. Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106.

Figure 2:
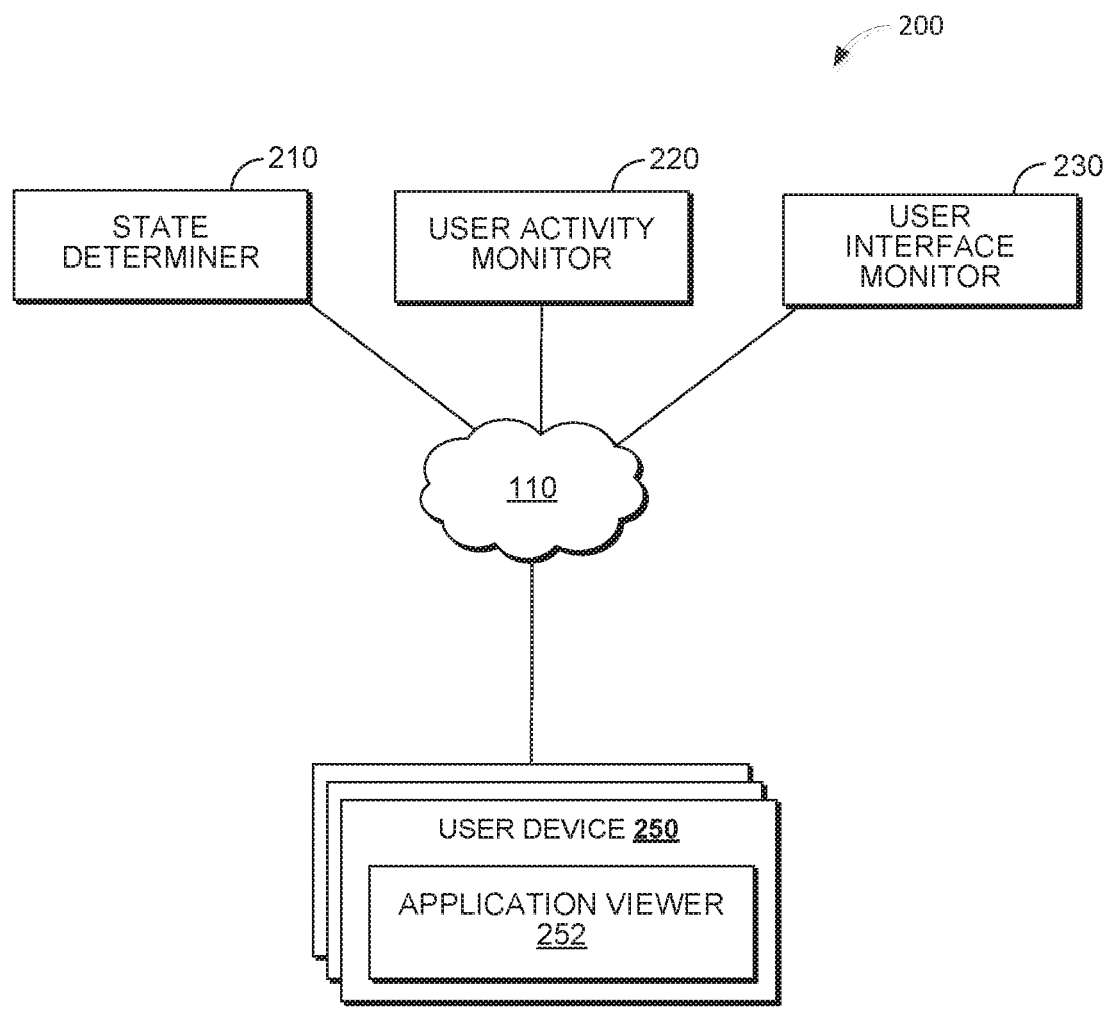
FIG. 2 is a diagram depicting an example computing architecture suitable for implementing aspects of the present disclosure.

Operating environment 100 can be utilized to implement one or more of the components of system 200, described in FIG. 2, including components for initially retrieving layout information on an application, monitoring activities of the user and modifications of the application, and performing an action based on the monitored activities and modifications. Operating environment 100 also can be utilized for implementing aspects of methods 300 and 400 in FIGS. 3 and 4, respectively.

Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including state determiner 210, user activity monitor 220, user interface monitor 230, and one or more user device(s) 250. State determiner 210, user activity monitor 220, user interface monitor 230, and subcomponents of user device(s) 250 may be embodied as a set of compiled computer instructions or functions, program modules, computer software services, or an arrangement of processes carried out on one or more computer systems, such as computing device 500 described in connection to FIG. 5, for example.

Continuing with FIG. 2, state determiner 210 is generally responsible for identifying the state of a user interface presented by an application. For example, the state includes elements of an application and the element types, properties, and locations in the application. In some embodiments, an element is identified by its type. For example, a block of text will be identified as an element of the application of the type text. It should be understood that an identified element can be identified at varying levels of granularity; for example, for a block of text, an entire block, a line of text, or a term in the text can be identified as an element of the application. The type of element can also be identified by different levels of granularity; for example, a block of text can be identified by as text, a title or body of the text, or any other identifier of text. The properties of the element can be tracked at different level and can include style properties (e.g., CSS style properties for web content). The spatial or logical location of an element can be an absolute location in the application. It should be understood that the location need not be an absolute location, and can be a location with regard to the location on a display area of user device 250 or relative to other elements. Thus, different users may have different locations for a same element on their respective user device. Moreover, the user interface items may be organized into a hierarchy, such as that used in the Document-Object Model (DOM) for content expressed in HTML and information regarding the structure capture by the state determiner 210. Furthermore, since a single user may change the size or position of a display area, e.g., by maximizing a window or changing a device's orientation, a same user device can identify different locations for a same element. The layout information of the user interface can be received by state determiner 210. In some embodiments, when a display area is changed or as user interface element properties (location, style, etc.) are modified, state determiner identifies the new locations and properties for the identified elements. Also, the content of the page layout and its properties may change as content is received or as the application modifies the content. The changes are captured to always reflect the current state of the layout.

In some embodiments, state determiner 210 also identifies properties of a display area. For example, state determiner 210 can identify which elements are displayed in the display area and location of elements with regard to the display area. As the elements are changed with regard to the display area, state determiner 210 can be updated with the layout of the display area. In some embodiments, state determiner 210 also identifies style properties. For example, state determiner 210 can capture CSS properties of a web page.

User activity monitor 220 is generally responsible for receiving indications of user activities associated with user device 250. For example, user activity monitor 220 can receive pointer presses, pointer movements, and keyboard presses. User activity monitor 220 is not limited to the aforementioned activities and can be any activity or absence of activity with respect the user device. For example, if the user scrolls to a section of an application and stays on that section of the application for a period of time, these activities are received by user activity monitor 220. User activity can also be inferred. For example, if a user scrolls down on an application so that an element is no longer displayed and then the user scrolls back so that the element is displayed, user activities with regard to that element can be received. Furthermore, activities of the user can also be observed by, e.g., sensor 103a described in FIG. 1. For example, a camera of user device 250 can record movement of the user and/or track eye movement, or a microphone of user device 250 can record spoken words of the user. Each user activity can be associated with one or more identified elements of the page. For example, if a user moves a pointer over an image, a pointer over or pointer hover event is associated with the image.

In some embodiments, sensor data is processed to only detect inferred actions. For example, instead of sending a raw trajectory of a pointer, an inferred user action like hover may be sent instead or, or in addition to, the lower level user interaction data.

User interface monitor 230 is generally responsible for receiving indications of a modification to the user interface presented on the application of user device 250. For example, a page may launch a pop-up window, add new content to a page or may change an image of the page. This modification is received and can be associated with an identified element. In some embodiments, the modification is associated with a new element of the application. In some embodiments, the modifications to the user interface are received as the content is received so that the state of the user interface is monitored. In some embodiments, changes to the page such as when the page is unloaded or when the page goes to the background are received. In some embodiments, the content resources and how long it takes to load content is also received. In some embodiments, the state of the application is also monitored, including whether the application is currently running and visible to the user, running in background mode, and similar application life cycle state changes. In some embodiments, application resource usage and activity is tracked (e.g., loading, DNS lookup, CPU/memory usage, frame rates, code profiling, etc.).

User device 250 includes input devices and sensors (not shown). User device 250 can also include an application viewer 252. Application viewer 252 allows an application to be viewed in a display area on user device 250.

Figure 3:
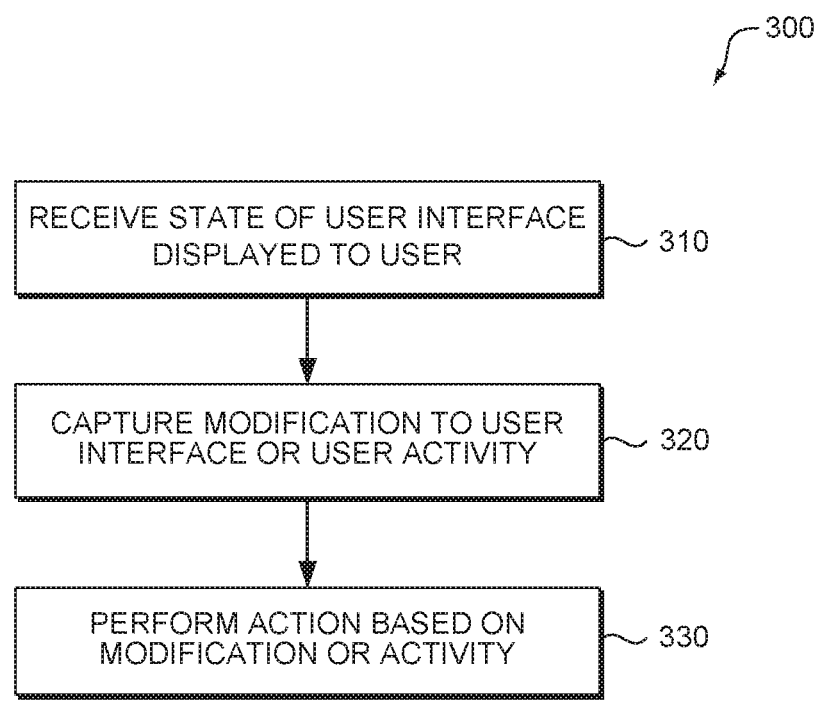
FIGS. 3 and 4 depict flow diagrams of methods for capturing user interactions, in accordance with embodiments of the present disclosure.

Turning to FIG. 3, a flow diagram is provided illustrating one example method 300 for capturing user interactions. In one embodiment, method 300 may be carried out as a cloud-based process or a distributed computing process, using one or more servers or other computing devices. Each block or step of method 300, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 310, a state of a user interface displayed to a user is received. The state can include layout information, where the layout information includes elements of the application, the type of element, and a location of the element. For example, an element can be an image, video, text, or any element that is rendered on an application. In some embodiment, the application is scanned to identify the elements and types. Thus, the elements need not be provided by a content provider and can be identified upon display of the application.

In some embodiments, other properties of the application are also received. For example, data on what elements are displayed, a size of the display area, or how long the application took to load can also be received.

At step 320, at least one of a modification to the user interface or a user activity is captured. The captured modification or activity is associated with an identified element of the user interface. By associating the modification or activity with an element of the user interface, data can be compressed allowing for savings of bandwidth and computer processing. For example, after an element is initially identified, a reference to the element can be used for each modification or activity associated with the element. Furthermore, by associating the modification or activity with an element, the modification or activity can be recreated for that element and/or a specific action can be performed with regard to that element. In some embodiments, only a subset of application elements based on a predetermined set of content items or by dynamically tracking element or events that meet a specific condition defined by the application provider that is determined by user interaction. For example, a search engine may wish to track the web search result in a web page but not the other parts of the page or track pointer movements when the user abandons the search results page.

In some embodiments, the user activity includes moving a pointer cursor in a display area, scrolling the application in the display area, and/or keyboard input in the application, among others.

In some embodiments, the data is optimized to reduce bandwidth required to share the data. For example, a reference to the element on the application may be indicated instead of the actual element. Furthermore, only the changes in the properties of the sensor data need to be captured. For example, instead of capturing each movement of a pointer, a delta or change of the movement can be captured. This delta can be sent when the movement reaches a threshold or after a predetermined duration. Similarly, for application state, only changes to the state, such as a change in position or properties for a specific item, need to be sent.

In some embodiments, the sensor data is captured opportunistically. For example, the data may be processed on the client device and received from the client device when the client device has sufficient processing resources available. In some embodiments, the sensor data is captured at predetermined intervals, when the data reaches a predetermined size, or when some predetermined event, such as loading a new page, occurs.

In some embodiments, the areas of the application to be monitored are determined. Thus, only those areas are monitored for changes in sensor data.

In some embodiments, the level of granularity of the data can be changed. Thus, the level of data and threshold data can be modified to provide less/more data.

In some embodiments, the application provider can gather new user activity for an application. For example, the application provider can define a new action that can be monitored on the user device. The new action need not be incorporated in the source of the application and be included in an application programming interface (API) that interacts with the application.

In some embodiments, the conversion of the data and the transmission of the data is performed asynchronously. For example, the formatting of the data can be performed opportunistically, e.g., when the user device has sufficient processing capacity to perform calculations on the sensor data and format the data for transmission. The actual transmission of the data, e.g., the capturing of the data, can be performed periodically, upon a size of the data, or upon the occurrence of an event.

At step 330, an action is performed based on the modification or activity. For example, if a plug-in adds an element to the user interface, the modification can be detected and the application may take corrective action with regard to the modification. For example, if the application detects unwanted content on a displayed page, the application may remove such content.

In some embodiments, content of an application can be loaded based on the modification or activity. For example, if data is captured with regard to a specific portion of content or type of content, that can cause the application to reorder the layout of the content or loading of content to maximize the user experience.

By capturing user interactions, a content or application provider can collect rich application experience data. Thus, the content or application provider can optimally allocate resources and layout of applications. Furthermore, by reducing the amount of data and modifying the format of data, the application can send data without affecting bandwidth and the user experience. For example, if the gathering takes too much bandwidth or processing, the performance of the application can be reduced, degrading user experience. Sending a large amount of information has a cost, especially for mobile users where there may be a cost to send each byte of data. So efficiency of information transmittal is a important factor. The amount of information is large in dynamic content application (content is changing constantly) and when doing high fidelity monitoring of sensor streams.

Figure 4:
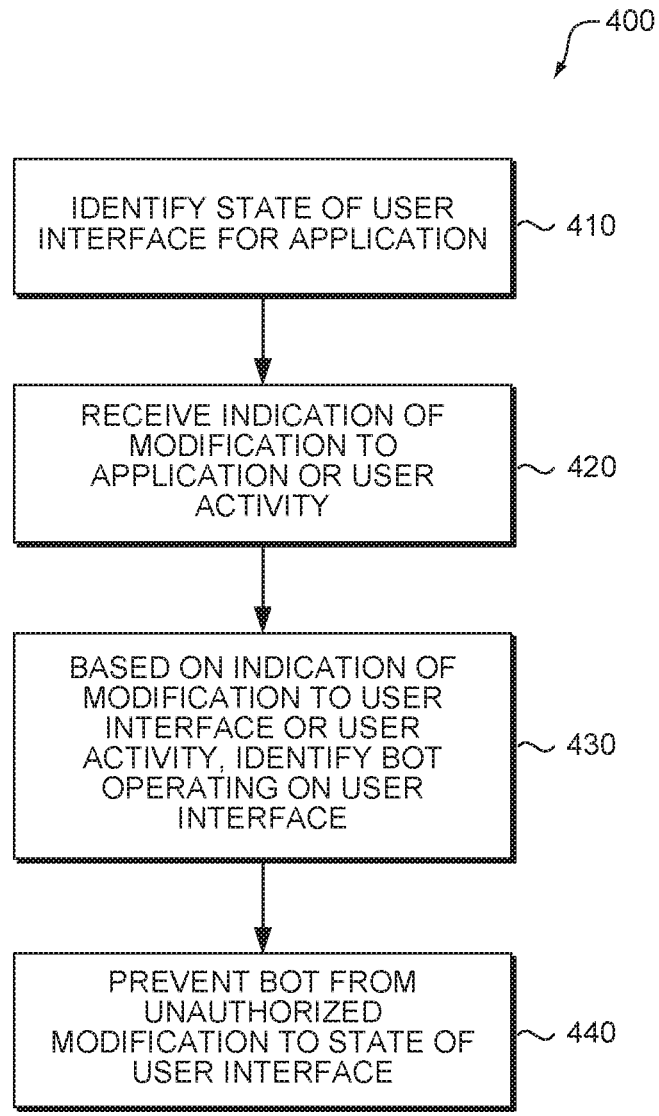

With reference now to FIG. 4, a flow diagram is provided illustrating one example method 400 for capturing user interactions. In some embodiments, method 400 may be carried out on a computing device such as server 105 described in FIG. 1.

Accordingly, at step 410, a state of a user interface is identified for an application. The state can include any elements of the application, and the element type and location.

At step 420, an indication of one of a modification to the user interface or a user activity is received, the one of a modification to the user interface or a user activity being associated with one of the elements.

At step 430, based on the indication of the one of a modification to the user interface or a user activity, a bot operating on the user interface is identified.

At step 440, the bot is prevented from unauthorized modification to the state of the user interface. For example, a bot can be prevented from injecting code into the user interface. It should be understood that some modification may be authorized, and the state of the user interface can be monitored to ensure that only those authorized modifications are performed.

Generally, anything that can be recorded and measured, e.g., in JavaScript, that describes both the user perception of the page and the off-screen elements available to be rendered can be captured. For example, the performance of the user interface (e.g. to load various objects, how long it takes a video pop-up to appear, delays in scrolling after a user scrolls), content of the user interface (e.g. how many images are on the page, how many bold words are there, what characters are present) can be captured. The current state of the user interface can also be captured, e.g., what is displayed in the user interface (e.g., how many of the bold words are rendered in client viewable area, how much does the user need to scroll to bring items into view, how long does the scrolling take, and how many items were not viewed by the user). This information allows for more robust data to be captured without affecting the user experience.

Accordingly, various aspects of technology directed to systems and methods for capturing user interactions are described. It is understood that various features, sub-combinations, and modifications of the embodiments described herein are of utility and may be employed in other embodiments without reference to other features or sub-combinations. Moreover, the order and sequences of steps shown in the example methods 300 and 400 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 5:
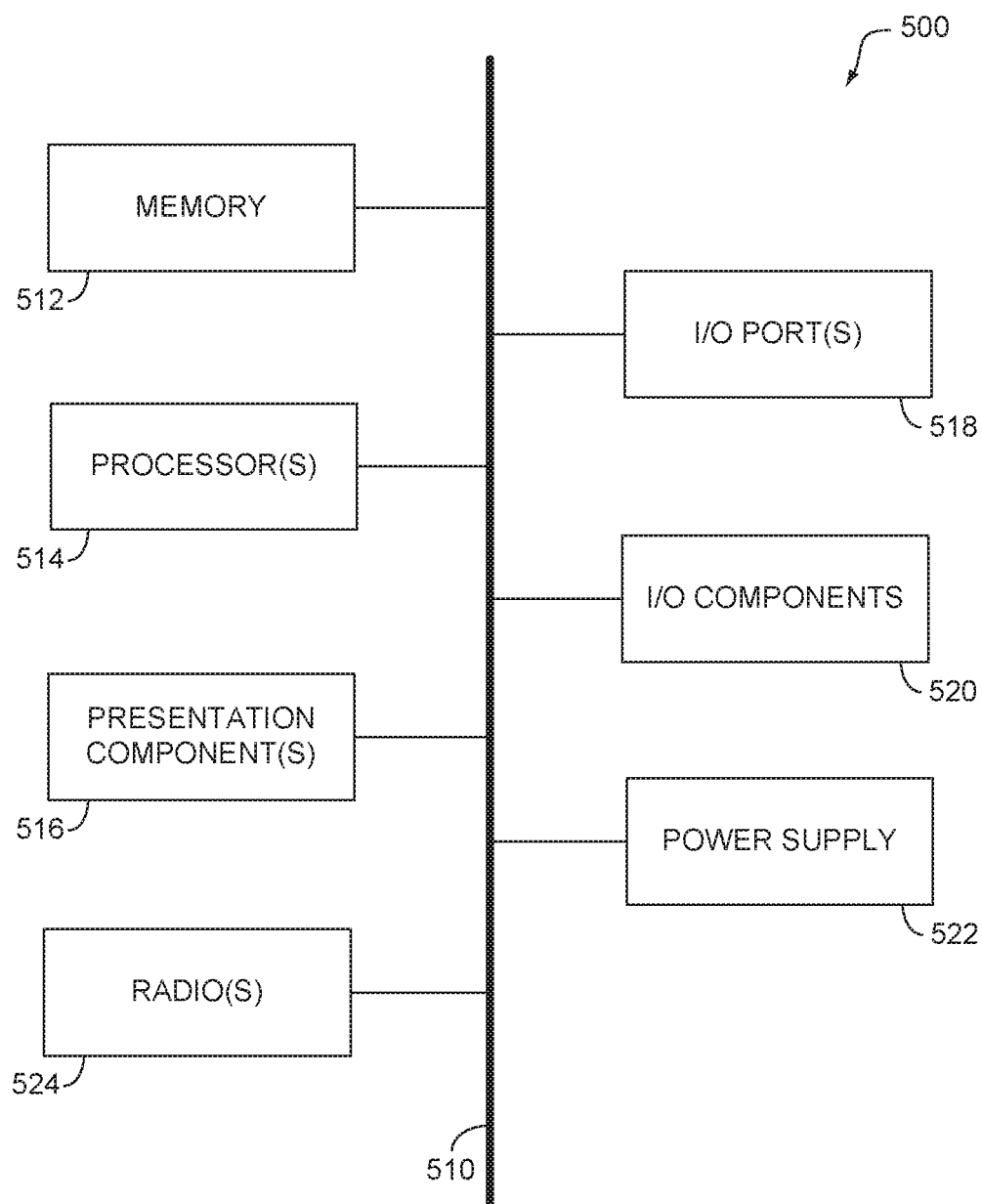
FIG. 5 is a block diagram of an exemplary computing environment suitable for use in implementing an embodiment of the present disclosure.

Having described various implementations, an exemplary computing environment suitable for implementing embodiments of the disclosure is now described. With reference to FIG. 5, an exemplary computing device is provided and referred to generally as computing device 500. The computing device 500 is but one example of a suitable computing environment and is not intended to suggest any limitation as to the scope of use or functionality of embodiments of the disclosure. Neither should the computing device 500 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 presents data indications to a user or other device. Exemplary presentation components include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include one or more radio(s) 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Embodiment 1

A system for capturing user interactions, comprising: a state determiner configured to identify a state of a user interface presented by an application, the user interface comprising a plurality of user interface elements; a user interface monitor configured to receive an indication of a modification to the user interface; a user activity monitor configured to receive an indication of a user activity, the user activity being associated with one of the plurality of user interface elements; and a state modifier configured to modify the state of the user interface based on at least one of the indication of a modification to the user interface or user activity.

Embodiment 2

The system of embodiment 1, wherein the state further comprises properties of a display area, the properties comprising at least one of user interface elements of the plurality of user interface elements displayed in the display area, style properties of the displayed user interface elements, location of user interface elements with regard to the display area, and actual content of the user interface elements.

Embodiment 3

The system of any of embodiments 1-2, wherein the user activity comprises a stream of pointer activity associated with a pointing mechanism.

Embodiment 4

The system of any of embodiments 1-3, wherein the user activity comprises a scrolling of a viewable area.

Embodiment 5

The system of any of embodiments 1-4, wherein the user interface monitor tracks application resource usage and activity.

Embodiment 6

The system of any of embodiments 1-5, wherein an indication of a modification to the application or user activity comprises a reference to the user interface element and a change of one or more properties of the user interface element.

Embodiment 7

The system of embodiment 6, wherein an indication of a modification to the application or user activity is received when the change of one or more properties of the user interface element reaches a threshold.

Embodiment 8

The system of any of embodiments 1-7, wherein the user activity monitor receives an indication of a user activity upon at least one of a predetermined interval, sensor data reaching a size limit, and occurrence of an event in the application.

Embodiment 9

The system of any of embodiments 1-8, wherein indication of a modification to the application or user activity comprises camera data.

Embodiment 10

A system comprising: one or more processors; and computer storage memory having computer-executable instructions stored thereon which, when executed by the processor, capture user interactions, comprising: identifying a state of a user interface presented by an application, the user interface comprising a plurality of user interface elements; receiving an indication of one of a modification to the application or a user activity, the one of a modification to the application or a user activity being associated with the at least one user interface element; modifying the state of the user interface based on the indication.

Embodiment 11

The system of embodiment 10, wherein the state comprises layout information the layout information comprising properties of a display area, the properties comprising elements displayed in the display area and location of elements with regard to the display area.

Embodiment 12

The system of any of embodiments 10-11, wherein the user activity comprises a scrolling of a viewable area.

Embodiment 13

The system of any of embodiments 10-12, wherein indication of one of a modification to the application or a user activity comprises a reference to the user interface element.

Embodiment 14

The system of any of embodiments 10-13, wherein indication of one of a modification to the application or a user activity comprises a number of elements displayed in the display area.

Embodiment 15

The system of any of embodiments 10-14, wherein indication of one of a modification to the application or a user activity comprises a whether a link associated with an element is clicked.

Embodiment 16

A computer-performed method for capturing user interactions, the method comprising: identifying a state of a user interface presented by an application, the user interface comprising a plurality of user interface elements; receiving an indication of one of a modification to the application or a user activity, the one of a modification to the application or a user activity being associated with one of the at least one user interface element; based on the one of a modification to the application or a user activity, identifying a bot operating on the user interface; and preventing unauthorized modification from the bot to the state of the user interface.

Embodiment 17

The method of embodiment 16, wherein the state comprises properties of a display area, the properties comprising elements displayed in the display area and location of elements with regard to the display area.

Embodiment 18

The method of embodiments 16-17, wherein the user activity comprises a duration of a cursor hovering over an identified element.

Embodiment 19

The method of embodiments 16-18, wherein the user activity comprises a scrolling of a viewable area.

Embodiment 20

The method of embodiments 16-19, wherein indication of one of a modification to the application or a user activity comprises a reference to the user interface element.

What is claimed is:

1. A system comprising:
one or more processors; and
computer storage memory having computer-executable instructions stored thereon which, when executed by the one or more processors, are configured to implement a method comprising:
identifying a state of a graphical user interface presented by an application on a computing device, the graphical user interface comprising a plurality of graphical user interface elements and the state comprising a layout of the plurality of graphical user interface elements;
based on a change to one or more properties of the plurality of graphical user interface elements satisfying a threshold amount of change, receiving an indication of one of a modification to the application or a user activity within the graphical user interface of the application, the one of the modification to the application or the user activity being associated with at least one graphical user interface element of the plurality of graphical user interface elements; and
based on the indication, optimizing the application by modifying at least one of the layout of the plurality of graphical user interface elements in the application or an order in which the plurality of graphical user interface elements is rendered in the application.

2. The system of claim 1, wherein the state comprises layout information, the layout information comprising properties of a display area, the properties comprising elements displayed in the display area and locations of elements with regard to the display area.

3. The system of claim 1, wherein the user activity comprises a scrolling of a viewable area.

4. The system of claim 1, wherein the indication of one of the modification to the application or the user activity comprises a number of elements displayed in a display area.

5. The system of claim 1, wherein the indication of one of the modification to the application or the user activity comprises an indication of whether a link associated with an element is clicked.

6. A computer-performed method for capturing user interactions, the method comprising:
identifying a state of a user interface presented by an application, the user interface comprising a plurality of user interface elements;
receiving an indication of one of a modification to the application or a user activity, the one of the modification to the application or the user activity being associated with one of the plurality of user interface elements;
based on the one of the modification to the application or the user activity, identifying a bot operating on the user interface; and
preventing an unauthorized modification from the bot to the state of the user interface.

7. The method of claim 6, wherein the state comprises properties of a display area, the properties comprising elements displayed in the display area and locations of elements with regard to the display area.

8. The method of claim 6, wherein the user activity comprises a duration of a cursor hovering over an identified element.

9. The method of claim 6, wherein the indication of one of the modification to the application or the user activity comprises a reference to a user interface element instead of the user interface element.

10. The method of claim 6, wherein the unauthorized modification comprises injecting code into the user interface.

11. One or more computer storage media storing computer-executable instructions that, when executed by a computing device, cause the computing device to perform a method comprising:
identifying a state of a user interface presented by an application, the user interface comprising a plurality of user interface elements and the state comprising a layout of the plurality of user interface elements;
receiving an indication of one of a modification to the application or a user activity within the user interface of the application, the one of the modification to the application or the user activity being associated with at least one user interface element of the plurality of user interface elements; and
based on the indication, modifying an order in which the plurality of user interface elements is rendered in the application.

12. The one or more computer storage media of claim 11, wherein the method further comprises determining an inferred user activity with regard to a user interface element of the plurality of user interface elements based on an amount of time the user interface element is in a display area.

13. The one or more computer storage media of claim 11, wherein the state further comprises properties of a display area, the properties comprising at least one of style properties of the plurality of user interface elements, a location of the plurality of user interface elements with respect to the display area, or content of the plurality of user interface elements.

14. The one or more computer storage media of claim 11, wherein the method further comprises monitoring at least one of resource usage or activity, the at least one of resource usage or activity comprising at least one of loading, DNS lookup, CPU or memory usage, frame rates, or coding profiling.

15. The one or more computer storage media of claim 11, wherein the indication of one of the modification to the application or the user activity within the user interface comprises a reference to the at least one user interface element instead of the at least one user interface element.

16. The one or more computer storage media of claim 11, wherein the indication of one of the modification to the application or the user activity within the user interface comprises a number corresponding to a quantity of user interface elements displayed within a display area.

17. The one or more computer storage media of claim 11, wherein the indication of one of the modification to the application or the user activity within the user interface is received when a change of one or more properties of the plurality of user interface elements reaches a threshold amount of change.

18. The one or more computer storage media of claim 11, wherein the indication of one of the modification to the application or the user activity within the user interface is received upon at least one of a predetermined time interval, sensor data reaching a size limit, or an occurrence of an event in the application.

19. The one or more computer storage media of claim 11, wherein the indication of one of the modification to the application or the user activity within the user interface is received based on a camera that records at least one of user movement or user eye movement.

20. The one or more computer storage media of claim 11, wherein modifying the order comprises modifying a temporal sequence in which the plurality of user interface elements is rendered in the application.

* * * * *